United States Patent [19]

Heider

[11] Patent Number: 4,465,917

[45] Date of Patent: Aug. 14, 1984

[54] STUD WELDER WITH MAGNETIC FOLLOW-UP

[75] Inventor: Erich E. Heider, West Allis, Wis.

[73] Assignee: Eaton Corporation, Cleveland, Ohio

[21] Appl. No.: 393,154

[22] Filed: Jun. 28, 1982

[51] Int. Cl.³ .............................................. B23K 9/20
[52] U.S. Cl. .......................................... 219/98; 219/95
[58] Field of Search ................................ 219/99, 98, 95

[56] References Cited

U.S. PATENT DOCUMENTS

| | | | |
|---|---|---|---|
| 2,640,133 | 5/1953 | Ainsworth et al. | 219/98 |
| 2,769,080 | 10/1956 | Welch | 219/108 |
| 2,776,362 | 1/1957 | Welch | 219/86.32 |
| 2,892,068 | 6/1959 | Park et al. | 219/86 |
| 3,564,191 | 2/1971 | Elzer et al. | 219/95 |
| 4,162,388 | 7/1979 | Heider | 219/96 |

OTHER PUBLICATIONS

*Modern Welding Technology*, Howard B. Cary, Prentice-Hall Inc., 1979, pp. 124–125.
"Percussion Welding", Welding Handbook, 6th Edition, Sec. 2, Chap. 27, edited by Arthur L. Phillips, published by American Welding Society, N.Y., 1969.
Instruction & Maintenance Manual Nelson NSA-80, Nov. 1970.
"Percussion Welding" R. F. Manning & J. B. Welch, Welding Journal, Sep. 1960, pp. 1–5.
"Percussion Welding", Metals Handbook, 8th Edition, vol. 6, Welding and Brazing, pp. 177–186.

*Primary Examiner*—Roy N. Envall, Jr.
*Assistant Examiner*—C. M. Sigda
*Attorney, Agent, or Firm*—Andrus, Sceales, Starke & Sawall

[57] ABSTRACT

A stud welder is provided with a pair of magnetic coils and a compression spring. One of the coils provides the lift to separate electrode held parts and start an arc therebetween. The other coil and the compression spring provide fast follow-up force driving the parts into reengagement to quench the arc and weld the parts together. The combined acceleration of the spring and the booster coil enables the welding of certain materials such as brass which were previously not weldable with stud welders.

12 Claims, 5 Drawing Figures

STUD WELDER WITH MAGNETIC FOLLOW-UP

TECHNICAL FIELD

The invention relates to the general class of welders known as stud welders. In stud welding, the parts to be welded are brought into engagement, followed by a slight lifting of the upper electrode to create a small gap between the parts and draw an arc thereacross, whereafter the parts are driven into reengagement, and weld together.

BACKGROUND

Stud welders are known in the art. An upper electrode holds a part which is lowered to engage another part on a lower electrode, and then lifted by an energized magnetic coil to start an arc between the parts, followed by spring biased driving force pushing the upper electrode downwardly such that the parts reengage and weld together. Another type of stud welder uses spring bounce to start the arc. In both types of stud welders, the follow-up force is provided by a compression spring.

A disadvantage of prior stud welders is their inability to weld certain materials, for example brass. It has been found that after the arc-starting lift, the follow-up is too slow, and that the arc begins to disintegrate the brass into zinc fumes before the arc is extinguished by reengagement of the parts. The zinc fumes may inhibit the arc, and when the parts come together there may not be a weld formed.

The present invention provides in combination a magnetic booster coil for supplying additional and faster follow-up force driving the upper electrode downwardly after the arc-starting lift. This faster follow-up enables the welding of materials such as brass which were not weldable with prior stud welders.

Magnetic follow-up is itself known, and has been used in welding systems other than stud welding. For example, percussion welding commonly uses magnetic follow-up force to provide the percussive blow to drive the parts together. However, in percussion welding the arc is not started by lifting the weld head. Instead an arc-starter or nib is provided on one of the parts, and when the parts are brought together a high current is passed through the arc-starter nib causing it to explode and start the arc across the gap between the parts. This requires 50,000 to 100,000 amps, and an exemplary application is the welding of contacts of diameter 0.4–1.125 inch. In contrast, stud welders typically require only 2,000 to 4,000 amps, and an exemplary application is the welding of contacts of 0.1–0.375 inch diameter. Unlike percussion welders, stud welders draw the arc by means of weld head lift, which in turn entails particular structural requirements.

For a further discussion highlighting the differences between stud welding and percussion welding, reference is made to my U.S. Pat. No. 4,162,388. For further reference regarding stud welding, reference is made to the commercially available Nelson NSA-80 stud welder, Instruction and Maintenance Manual dated November, 1970, TRW Nelson Division, 28th Street and Toledo Ave., Lorain, OH 44055. For further background regarding percussion welding, reference is made to: "Percussion Welding" R. F. Manning and J. B. Welch, *Welding Journal*, Sept. 1960, pgs. 1–5; "Percussion Welding" *Metals Handbook*, 8th Edition, Vol. 6, *Welding and Brazing*, pgs. 177–186, prepared under the direction of the ASM Handbook Committee, American Society for Metals, Metals Park, OH., 1971; and "Percussion Welding", *Welding Handbook*, 6th Edition, Sec. 2, Chap. 27, edited by Arthur L. Phillips, published by American Welding Society, N.Y., 1969. For further background regarding various magnetic follow-up systems reference is made to Welch U.S. Pat. Nos. 2,769,080 and 2,776,362, and Park et al U.S. Pat. No. 2,892,068.

SUMMARY

The present invention provides in a stud welder a magnetic follow-up system in combination with an arc-drawing lift system. The invention further provides the magnetic follow-up system in addition to and in cooperation with spring biased follow-up force.

The invention further provides various structural improvements in stud welder construction, including the incorporation of a magnetic booster coil in cooperative relation with both a magnetic lift coil and a subsequent spring biased follow-up means.

In preferred form, a magnetic lift coil is rigidly secured to a vertically reciprocal mounting plate, and a magnetic follow-up booster coil is secured to the plate coaxially above the lift coil. Two piece shaft means includes a vertically reciprocal lower shaft in the lift coil and a vertically reciprocal upper shaft in the follow-up booster coil. At the bottom of the lower shaft is the upper electrode holding a part to be welded. The upper and lower shafts move down with the mounting plate until the upper electrode part engages the part on the lower electrode. The mounting plate continues to move downwardly, which in turn causes the lower shaft to move upwardly within the lift coil, and which also compresses a pressure spring.

Nonmagnetic guide pin means is mounted between the lower and upper shafts in lost motion relation, such that as the mounting plate moves downwardly after engagement of the parts, the lower shaft moves upwardly within the lift coil but the upper shaft remains stationary within the follow-up booster coil. After downward movement of the mounting plate is halted, the lift coil is energized, which raises the lower shaft and starts an arc in the gap created between the parts. This energized lift of the lower shaft also raises the upper shaft within the follow-up booster coil by means of the guide pin whose lost motion has been traveled through and taken up. Energization of the follow-up booster coil drives the upper shaft, the guide pin and the lower shaft downwardly in engagement without lost motion, and in combination with the pressure spring, to extinguish the arc and weld the parts together.

In one desirable aspect of the invention, there is enabled selective energization timing of the follow-up booster coil to afford flexibility for various applications and materials. For example, the invention enables one particularly advantageous implementation in which the follow-up booster coil is energized before deenergization of the lift coil. This eliminates any delay which might otherwise be caused during build-up of driving forces and instead applies charged magnetic follow-up force immediately upon release by the lift coil. This is particularly desirable in applications where fast follow-up is needed to drive the parts into engagement before disintegration to fumes which may otherwise inhibit the arc and the welding of the parts.

In another desirable aspect of the invention, a double bearing system is provided which prevents wobble and tilt of the weld head, which has been a problem in prior stud welders. Wobble and tilt of the welding head becomes more pronounced with age, and adversely affects reliability.

The invention further relates to improvements in the electrical control system for stud welders in combination with magnetic follow-up. The system enables variable selective control of both the timing and the amount of lift force and of follow-up force.

DETAILED DESCRIPTION

Figure 1:
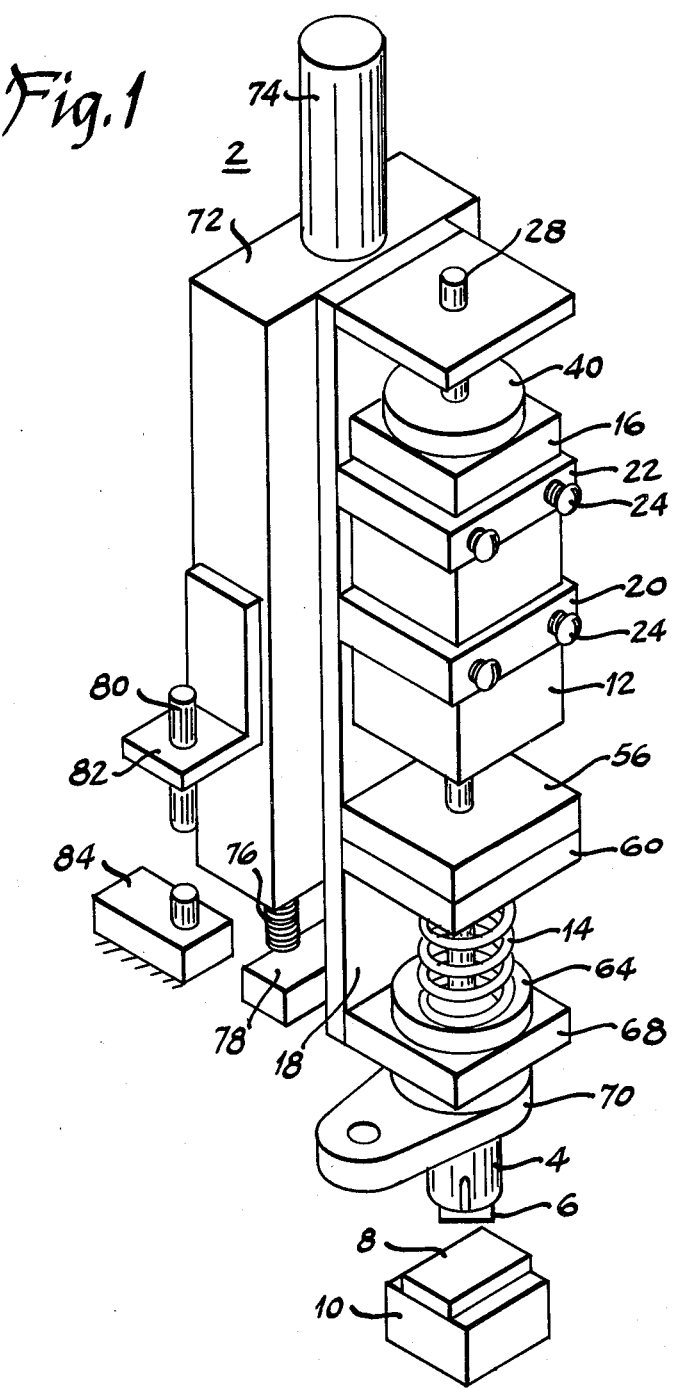
FIG. 1 is a pictorial illustration of a stud welder constructed in accordance with the invention.
Figure 2:
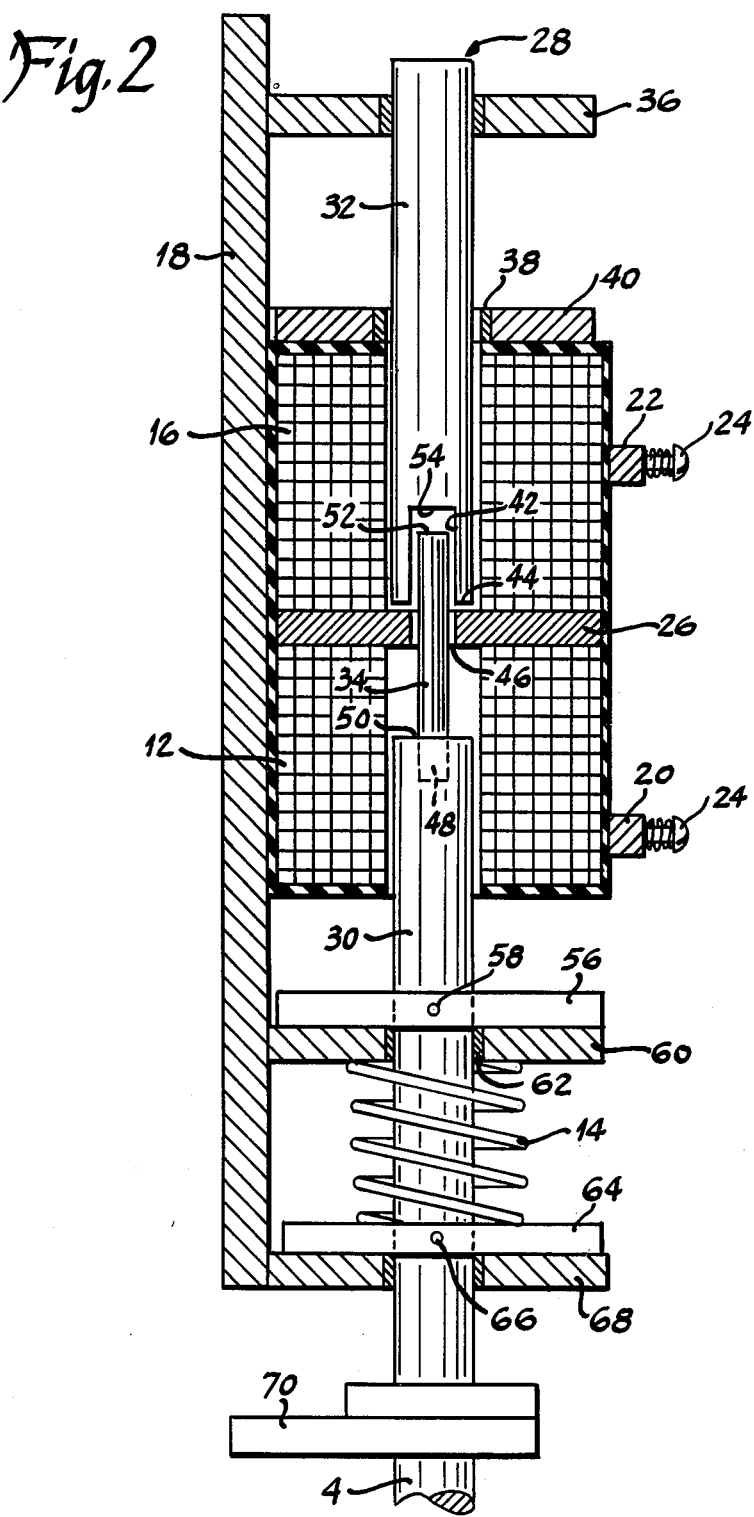
FIG. 2 is a sectional view of the welder of FIG. 1.

Referring to FIGS. 1 and 2, a stud welder 2 has an upper electrode 4 holding a part 6 which is lowered to engage another part 8 on a lower electrode 10 and then lifted by an energized magnetic coil 12 to start an arc in the gap created between the parts. Follow-up force provided by pressure spring 14 and magnetic booster coil 16 drive the upper electrode downwardly such that parts 6 and 8 reengage and weld together.

Lift coil 12 and follow-up booster coil 16 are rigidly mounted in coaxial relation on a vertically reciprocal mounting plate 18 by means of U-shaped clamps 20 and 22 which are fixedly secured at their distal ends to mounting plate 18 and have set screws such as 24 to be tightened against the respective coil extending therethrough. A nonmagnetic spacer plate 26, FIG. 2, is between the coils. Axial shaft means 28 extends vertically within the coils. A two piece shaft is provided comprising a lower shaft 30 in the lift coil and an upper shaft 32 in the booster coil, and further including nonmagnetic guide pin 34 mounted between the shafts in lost motion relation.

Upper shaft 32 extends freely through an upper bearing 36 rigidly secured to mounting plate 18. Upper shaft 32 extends downwardly through a nonmagnetic brass bushing 38 of a steel backing plate 40 rigidly secured to the top of booster coil 16. Upper shaft 32 extends down within the core of coil 16 and has a downwardly opening cavity 42 into which guide pin 34 upwardly extends. Upper shaft 32 is free to move vertically, and its downward limit of movement is set by engagement of its lower lip 44 with divider plate 26.

Guide pin 34 is preferably brass, and extends vertically freely through aperture 46 in divider plate 26. In FIG. 2, pin 34 resets at its bottom end 48 in an upwardly opening notch or cavity 50 of lower shaft 30. The upper end 52 of pin 34 extends partially into cavity 42 of upper shaft 32 and leaves a small gap to the top edge 54 of such cavity.

Lower shaft 30 extends downwardly out of the core of lift coil 12. A lift armature plate 56 is fixedly secured to lower shaft 30 by pin 58. A spring-stop plate 60 is fixedly secured to mounting plate 18, and has an aperture 62 through which lower shaft 30 extends. Another spring-stop plate 64 is fixedly secured to shaft 30 by pin 66. Compression pressure spring 14 is coaxially disposed around lower shaft 30 and bears between spring-stops 60 and 64. Lower shaft 30 extends further downwardly through a lower bearing plate 68 rigidly secured to mounting plate 18. The lower end of lower shaft 30 includes an electrical connection terminal 70 and upper electrode 4. Lower shaft 30 is freely vertically reciprocal in lift coil 12 and its upward movement is limited by engagement of armature plate 56 against the bottom of coil 12.

In operation, mounting plate 18 is lowered to effect engagement of parts 6 and 8, for example by means of slide system 72 and air cylinder 74, FIG. 1. Shaft means 28 moves down with mounting plate 18 until upper electrode part 6 engages lower electrode part 8. Continued downward movement of mounting plate 18 causes lower shaft 30 to move relatively upwardly within lift coil 12, compressing spring 14 between spring-stops 60 and 64, FIG. 3. This upward movement of lower shaft 30 also raises guide pin 34 upwardly to travel through the remainder of cavity 42 and take up the lost motion up to top edge 54 of such cavity in the upper shaft 32. Continued downward movement of mounting plate 18 then causes relative upward movement of upper shaft 32 within booster coil 16. The downward movement of mounting plate 18 is stopped when adjustable stop screw 76, FIG. 1, hits stop plate 78.

Figure 4:
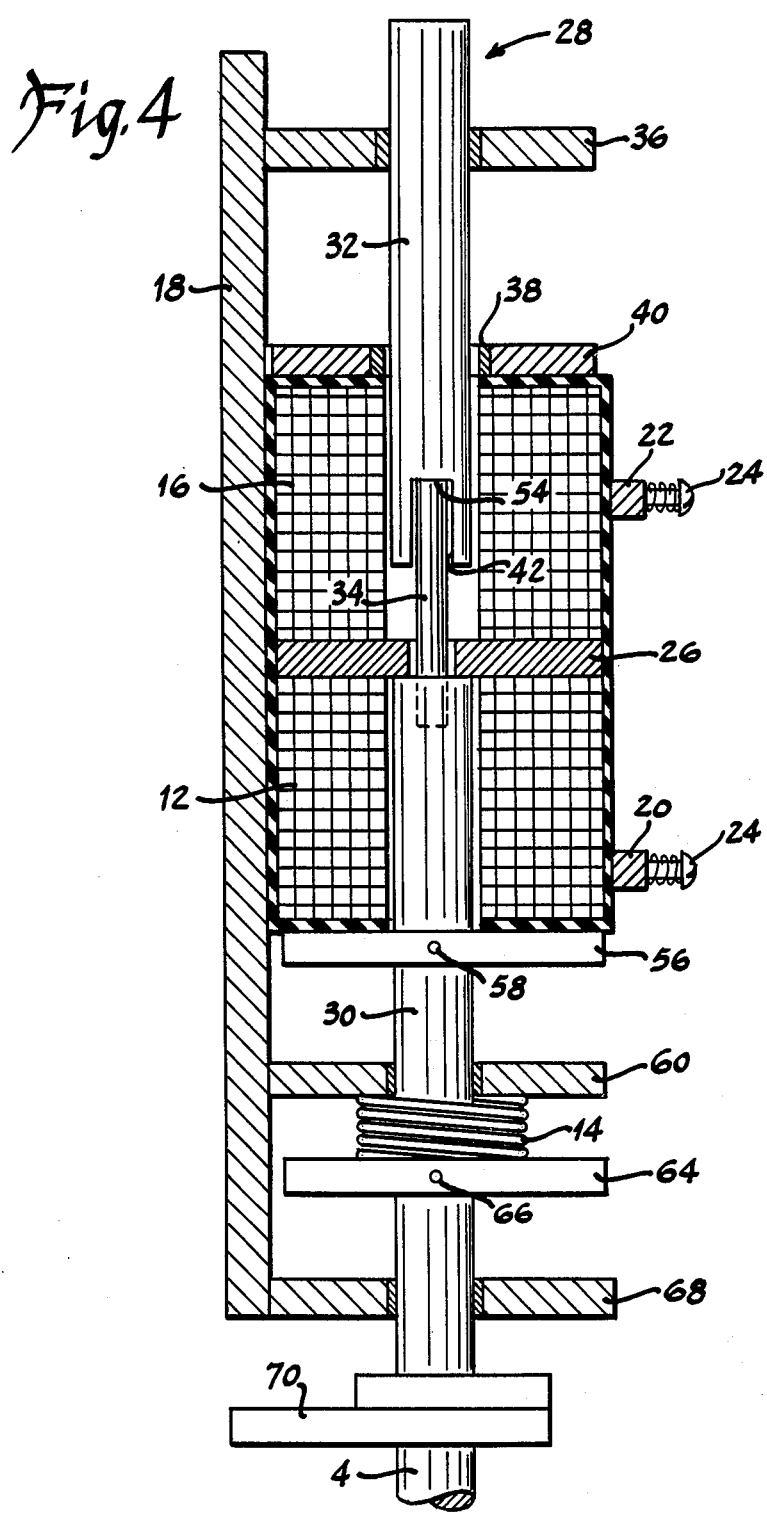
FIG. 4 is a sectional view like FIG. 2 further showing operation of the welder.

At the bottom of the travel stroke of mounting plate 18, adjustable trip screw 80 on bracket 82, mounted to slide system 72, trips a microswitch 84, FIG. 1. As more fully described hereinafter, the electrical control system then passes current through parts 6 and 8 between the upper and lower electrodes, and also energizes lift coil 12 to attract armature 56. This raises armature 56 into engagement with the bottom of lift coil 12, FIG. 4, which lifts lower shaft 30 and electrode 4 to start an arc in the gap created between parts 6 and 8. In the preferred implementation, the gap is between 0.020 and 0.100 inch. This arc-starting lift also raises upper shaft 32 within coil 16, and further compresses spring 14. A charge from a large capacitor through an inductor is placed across the mini-arc causing a large arc, to be described.

Deenergization of lift coil 12 releases lift armature 56 to permit downward movement of lower shaft 30. Energization of booster coil 16 applies a magnetic force on upper shaft 32, driving the latter downwardly. This magnetic follow-up force is transmitted through guide pin 34 without lost motion to lower shaft 30 in addition to the spring biased follow-up force from compressed pressure spring 14. Part 6 is thus driven into reengagement with part 8 to extinguish the arc and weld the parts together.

Figure 5:
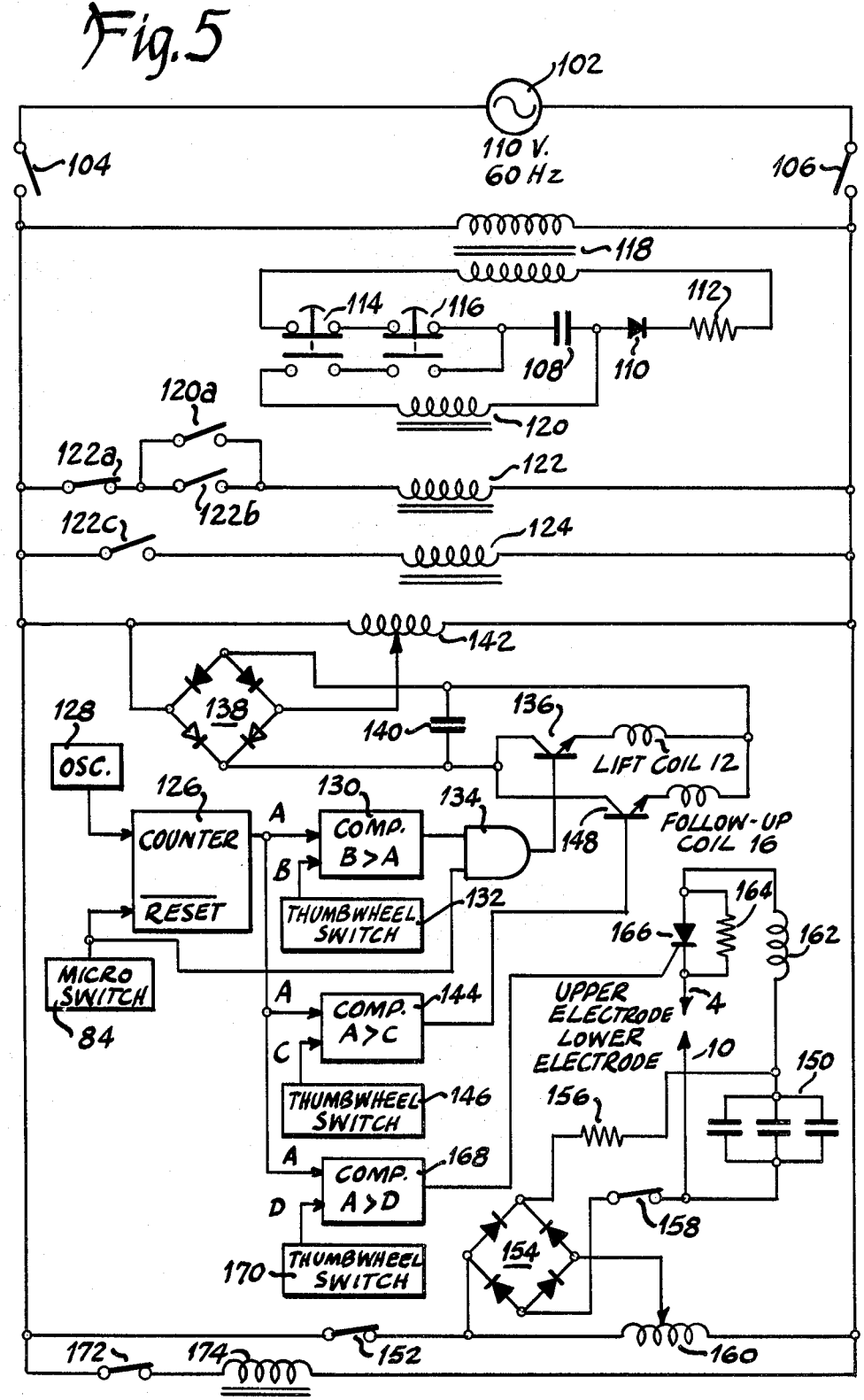
FIG. 5 is a schematic circuit diagram showing the electric control circuitry for the welder.

FIG. 5 schematically shows the electric control circuitry for the welder. It is an advantage of the invention that it may be powered from a 110 volt, 60 hertz line, as shown at 102. Disconnect switches 104 and 106 are provided for safety. In operation, capacitor 108 is charged by rectifier diode 110 through protective resistor 112 through normally closed palm button switches 114 and 116 from isolation transformer 118. The operator actuates switches 114 and 116 by depressing the palm buttons, which opens the charging circuit through the upper sets of contacts and closes the circuit through the lower sets of contacts of switches 114 and 116, putting the charge of capacitor 108 across relay coil 120, which closes relay contacts 120a. This allows current to flow through normally closed relay contacts 122a then through relay contacts 120a then through the coil of relay 122, thus energizing relay 122 to close relay contacts 122b and maintain a closed circuit through relay 122. Contacts 120a open when the charging pulse from capacitor 108 is depleted.

Figure 3:
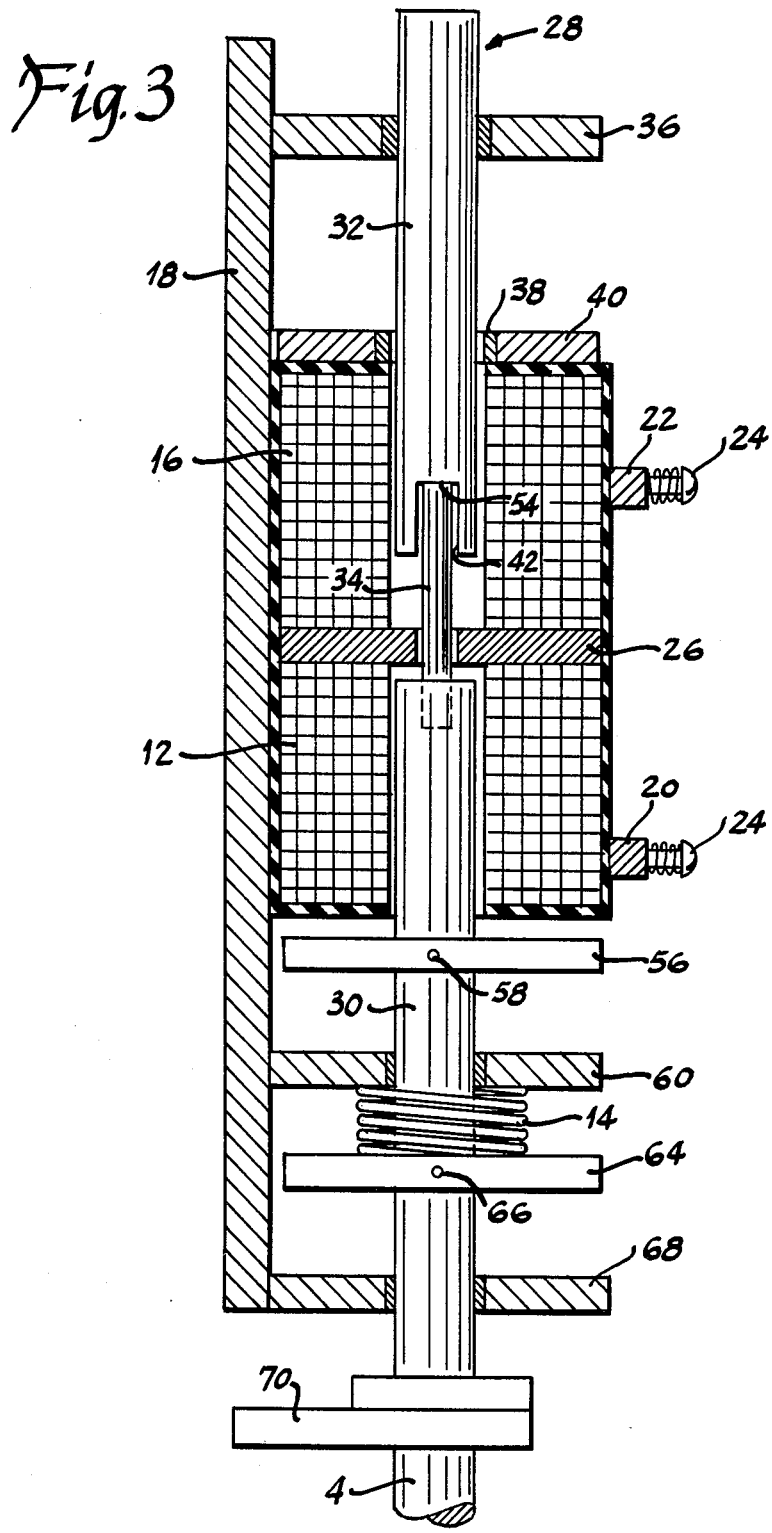
FIG. 3 is a sectional view like FIG. 2 illustrating operation of the welder.

Energization of relay 122 further closes relay contacts 122c which completes a circuit through the solenoid valve 124 of air cylinder 74, whereby slide system 72 and mounting plate 18 move downwardly as shown in FIG. 3 and stop when screw 76 hits stop plate 78, FIG. 1. Upper electrode part 6 engages lower electrode part 8, and lower shaft 30 moves upwardly relative to coil 12 and mounting plate 18 as above described. When mounting plate 18 is at the bottom of its travel stroke, screw 80, FIG. 1, trips microswitch 84.

Referring to FIG. 5, actuation of microswitch 84 provides a high signal to the reset input of a counter 126. The high state from microswitch 84 is thus inverted low to disable the reset function, such that counter 126 is incremented by oscillator 128. The output of counter 126, designated A, is delivered to a comparator 130. A thumbwheel switch 132 provides the other input, designated B, to comparator 130. The output of comparator 130 is high when B is greater than A. The operator selects a given number for B through thumbwheel switch 132. An AND gate 134 has one input from comparator 130 and another input from microswitch 84. Upon actuation of microswitch 84, both inputs to AND gate 134 are high, whereby the output of AND gate 134 goes high and drives transistor 136 into conduction, which completes a circuit through lift coil 12 to energize the latter and provide the arc-starting lift for axial shaft means 28 and electrode 4, FIG. 4. Coil voltage is supplied through a diode rectifier bridge 138 and smoothing capacitor 140, and is selectable according to the setting of variac 142. Coil voltage is preferably 80+ volts. When the incremented contents A of counter 126 becomes greater than B, the output of comparator 130 goes low, whereby the output of AND gate 134 goes low and transistor 136 turns off, deenergizing lift coil 12.

The incremented contents A from counter 126 is also applied to another comparator 144. The other input C to comparator 144 is from a thumbwheel switch 146. Initially, A is less than C and the output of comparator 144 is low. When the incremented value A becomes greater than C, the output of comparator 144 goes high which turns on transistor 148, to close a circuit through follow-up booster coil 16, energizing the latter to provide the magnetic follow-up force described above. This coil voltage is also supplied from the power source provided by bridge 138, capacitor 140 and variac 142.

Voltage for electrodes 4 and 10 is supplied by a capacitor bank 150 which is charged through normally closed switch 152, diode rectifier bridge 154 and protective resistor 156, and returned through normally closed switch 158 and adjusted by variac 160. When energization of lift coil 12 lifts shaft system 28, the voltage from capacitor bank 150 and inductor 162 establishes a mini-arc between parts 6 and 8 due to a restricted current through bypass resistor 164. After this mini-arc is established, the full charge of capacitor band 150 through inductor 162 is applied to the electrodes by firing SCR 166. This results in a large arc between parts 6 and 8 which spreads over their facing surfaces, causing thin surface layer melting. Upon energization of follow-up coil 16 and deenergization of lift coil 12, parts 6 and 8 with their molten facing surface layers are pushed together by pressure spring 14 with an additional assist and acceleration from the magnetic follow-up force. The arc is quenched and the weld is made when the molten surfaces solidify, usually within about one millisecond.

The timing of the firing of SCR 166 into conduction is coordinated with the timing of energization of coils 12 and 16. The incremented contents A from counter 126 is delivered to a third comparator 168. The other input D to comparator 168 is selectable by the operator according to thumbwheel switch 170. When A is incremented to a value greater than D, the output of comparator 168 goes high, which triggers SCR 166 into conduction.

In preferred form, the numbers B, C, and D are chosen such that lift coil 12 is initially energized, followed by a given delay for stabilization of the arc, followed by firing of SCR 166, followed by energization of follow-up coil 16, followed by deenergization of lift coil 12. In this implementation, B>C>D. Energization of follow-up coil 16 just prior to deenergization of lift coil 12 enables charged magnetic follow-up force to be immediately applied upon release by lift coil 12, without an inherent delay for build-up of magnetic force. This faster application of downward acceleration provides faster reengagement of the parts, which is particularly desirable in the welding of certain materials. For example, in the welding of brass, the parts are reengaged before disintegration to zinc fumes which may otherwise inhibit the arc and the welding of the parts. The timing flexibility and programmability afforded by the control, including operator set thumbwheel switches 132, 146 and 170, readily facilitates the desired coordination of components in a particularly easy manner.

After completion of the weld, relay 122 may be deenergized by manual switch means, or by timed relay contacts 122a which open after a given delay. This delay must expire after completion of the weld, but is otherwise not critical relative to the coordinated timing between comparators 130, 144 and 168. In response to deenergization of relay 122, contacts 122c open, which in turn deenergizes air solenoid valve 124, whereby slide system 72 and mounting plate 18 move upwardly. In response to this upward movement, screw 80 disengages microswitch 84 and the output of the latter goes low. The low state from microswitch 84 is inverted at the reset input of counter 126 to a high state, thus providing a continuous reset signal to the counter, which in turn prevents incrementation, whereby the contents A stays at zero. The low state from microswitch 84 insures that the output of AND gate 134 will be low and keep lift coil 12 deenergized. Since the contents A is now zero, the outputs of comparators 144 and 168 go low, deenergizing coil 16 and removing gate drive from SCR 166. To prepare for the next welding operation, normally closed switch 172 is opened, which deenergizes relay 174, which in turn closes normally closed contacts 152 and 158 to charge capacitor bank 150. Before slide system 72 and mounting plate 18 start down again, switch 172 is closed to energize relay 174 and open relay contacts 152 and 158.

It is recognized that various modifications are possible within the scope of the appended claims.

I claim:

1. In a stud welder having an upper electrode holding a part which is lowered to engage another part on a lower electrode and then lifted by an energized magnetic coil to start an arc between the parts, followed by spring biased driving force pushing the upper electrode downwardly such that the parts reengage and weld together, the improvement comprising a second magnetic booster coil energized to supply additional and faster follow-up force driving said upper electrode downwardly after said arc-starting lift.

2. The invention according to claim 1 wherein said magnetic booster coil is energized before deenergization of said first mentioned lift coil whereby to apply charged magnetic follow-up force immediately upon release of the latter, and drive said upper electrode downwardly to reengage said parts before disintegration to fumes which may otherwise inhibit said arc and the welding of said parts.

3. The invention according to claim 1 wherein said lift coil and said booster coil are coaxially mounted on a vertically movable mounting plate, and wherein said upper electrode is part of axial shaft means extending vertically within said coils.

4. The invention according to claim 3 wherein said shaft means moves down with said mounting plate until said upper electrode part engages said lower electrode part, said lift coil being energized to raise said shaft means and start an arc in the gap created between said upper electrode part and said lower electrode part, said booster coil being energized to drive said shaft means downwardly to extinguish said arc and weld said parts.

5. The invention according to claim 4 comprising a two piece said shaft means, a first shaft for said lift coil and a second shaft for said booster coil, and comprising nonmagnetic guide pin means between said first and second shafts.

6. The invention according to claim 5 wherein said guide pin means is mounted between said first and second shafts in lost motion relation, such that said mounting plate moves downwardly after engagement of said parts and said first shaft moves upwardly within said lift coil and said second shaft remains stationary relative to said booster coil, and such that when said lift coil is energized, said first shaft moves upwardly within said lift coil and said guide pin means moves upwardly between said coils and said second shaft moves upwardly within said booster coil, and such that when said booster coil is energized, said second shaft and said guide pin means and said first shaft are driven downwardly in engagement without lost motion.

7. The invention according to claim 6 comprising pressure spring means disposed axially around said shaft means and bearing between a first spring-stop fixed to said mounting plate and a second spring-stop fixed to said shaft means, said spring means being compressed by continued downward movement of said shaft means after engagement of said parts, and further compressed by said raising of said shaft means in response to said energization of said lift coil.

8. The invention according to claim 7 comprising a double bearing system including upper and lower shaft bearings, one for each of said first and second shafts, each bearing rigidly secured to said mounting plate and guiding its respective said shaft in reciprocal vertical axial movement.

9. The invention according to claim 8 wherein said magnetic booster coil is energized before deenergization of said lift coil.

10. A stud welder with magnetic follow-up, comprising:
a vertically movable mounting plate;
a magnetic lift coil rigidly secured to said mounting plate;
a lower axial shaft vertically reciprocal in said lift coil, said blower shaft including an upper electrode holding a part to be welded;
a lower electrode below said upper electrode and holding another part to be welded;
means limiting the upward movement of said lower shaft relative to said lift coil;
a magnetic follow-up coil rigidly secured to said mounting plate coaxially above said lift coil;
an upper axial shaft vertically reciprocal in said booster coil;
nonmagnetic means interconnecting said upper and lower shafts and extending axially between said coils;
said mounting plate being movable downwardly to effect engagement of said parts, said lift coil being energizable to raise said lower shaft and start an arc across the gap created between said parts, said follow-up coil being energizable to drive said upper shaft and electrode downwardly to extinguish said arc and weld said parts.

11. The invention according to claim 10 wherein said nonmagnetic interconnection means comprises lost motion guide pin means permitting a given distance upward travel of said lower shaft relative to said lift coil while said upper shaft remains stationary relative to said follow-up coil, said lost motion being traveled through and taken up prior to said lower shaft reaching its upward limit of movement set by said upward movement limiting means, such that continued movement of said lower shaft to said upward limit also effects upward movement of said upper shaft relative to said follow-up coil,
and comprising means limiting the downward movement of said upper shaft relative to said follow-up coil such that upon deenergization of said coils and upward movement of said mounting plate, said upper shaft stops its downward movement relative to said follow-up coil at the downward limit of movement set by said downward movement limiting means, and said lower shaft continues to move downwardly relative to said lift coil to reinstate said lost motion.

12. A stud welder with magnetic follow-up, comprising:
a vertically movable mounting plate;
a magnetic lift coil rigidly secured to said mounting plate;
a lower axial shaft vertically reciprocal in said lift coil, said lower shaft including an upper electrode holding a part to be welded;
a lower electrode below said upper electrode and holding another part to be welded, said mounting plate being movable downwardly to effect engagement of said parts;
a first spring-stop rigidly secured to said lower shaft;
a second spring-stop rigidly secured to said mounting plate;
a pressure spring axially disposed around said lower shaft between said first and second spring-stops;
means limiting the upward movement of said lower shaft relative to said lift coil;
a magnetic follow-up coil rigidly secured to said mounting plate coaxially above said lift coil;
an upper axial shaft vertically reciprocal in said booster coil;

nonmagnetic means interconnecting said upper and lower shafts and extending axially between said coils, comprising lost motion guide pin means permitting a given distance upward travel of said lower shaft relative to said lift coil while said upper shaft remains stationary relative to said follow-up coil when said mounting plate continues to move downwardly after engagement of said parts, said lift coil being energizable to raise lower shaft and start an arc across the gap created between said parts, said lost motion being traveled through and taken up prior to said lower shaft reaching its upward limit of movement set by said upward movement limiting means, such that continued movement of said lower shaft to said upward limit also effects upward movement of said upper shaft relative to said follow-up coil, said follow-up coil being energizable to drive said upper shaft and said guide pin means and said lower shaft downwardly in conjunction with said pressure spring compressed by said upward movement of said lower shaft, to extinguish said arc and weld said parts.

* * * * *